United States Patent [19]
Matsushita et al.

[11] Patent Number: 4,982,393
[45] Date of Patent: Jan. 1, 1991

[54] INFORMATION RECORDING AND/OR REPRODUCING APPARATUS PROVIDED WITH MEANS FOR DETECTING ABNORMALITY OF TRACKING SERVO

[75] Inventors: Machiko Matsushita, Yokohama; Shigeto Kanda, Machida; Eiji Yamaguchi, Kawasaki, all of Japan

[73] Assignee: Canon Kabushiki Kaisha, Tokyo, Japan

[21] Appl. No.: 233,489

[22] Filed: Aug. 17, 1988

[30] Foreign Application Priority Data

Aug. 31, 1987 [JP] Japan ............................... 62-215445
Aug. 31, 1987 [JP] Japan ............................... 62-215447
Aug. 31, 1987 [JP] Japan ............................... 62-215449
Jan. 29, 1988 [JP] Japan ................................. 63-17164
Feb. 3, 1988 [JP] Japan ................................. 63-22079

[51] Int. Cl.$^5$ ............................................. G11B 7/00
[52] U.S. Cl. ................................................ 369/44.32
[58] Field of Search ............................ 369/43–47, 369/53, 54–58, 106, 107, 115, 116, 44.32; 250/201 DF; 235/454, 470; 360/75, 77.01, 77.02

[56] References Cited
U.S. PATENT DOCUMENTS 4,554,465 11/1985 Maeda et al. ........................ 369/44
4,692,915 9/1987 Moriya et al. ................... 369/45 X
4,703,468 10/1987 Baba et al. ........................... 369/44
4,764,860 8/1988 Takao .................................. 369/43
4,788,421 11/1988 Ogawa et al. .................. 369/44 X
4,912,697 3/1990 Enari et al. ......................... 369/116

FOREIGN PATENT DOCUMENTS 0088538 9/1983 European Pat. Off. .
0164642 12/1985 European Pat. Off. .
61-216133 9/1986 Japan .

Primary Examiner—Robert L. Richardson
Attorney, Agent, or Firm—Fitzpatrick, Cella, Harper & Scinto

[57] ABSTRACT

An apparatus for applying a light beam to an optical recording medium having tracks provided thereon and effecting at least one of recording and reproduction of information includes a light source emitting the light beam, an optical system for directing the light beam emitted from the light source to the medium, a device for receiving the light flux reflected by or transmitted through the medium and detecting a tracking error signal indicative of the deviation between the applied position of the light beam and a track, a tracking servo for moving at least a portion of the optical system on the basis of the tracking error signal and correcting the applied position of the light beam, a detector for detecting abnormality of tracking servo from the velocity of the moved portion of the optical system.

29 Claims, 17 Drawing Sheets

FIG. 8
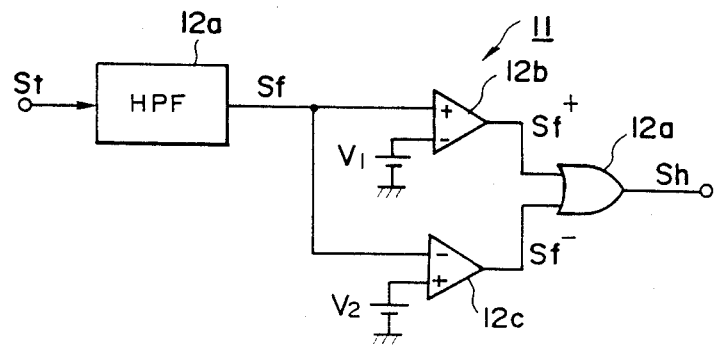
FIG. 9A
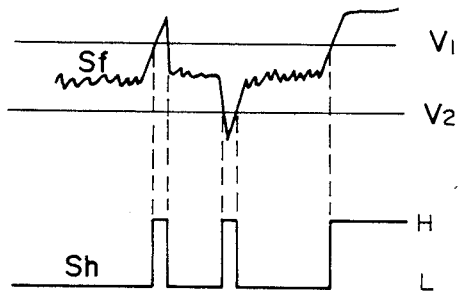
FIG. 9B
FIG. 10
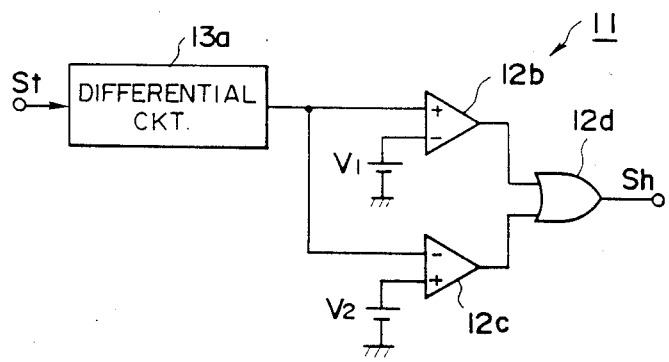

FIG. 12
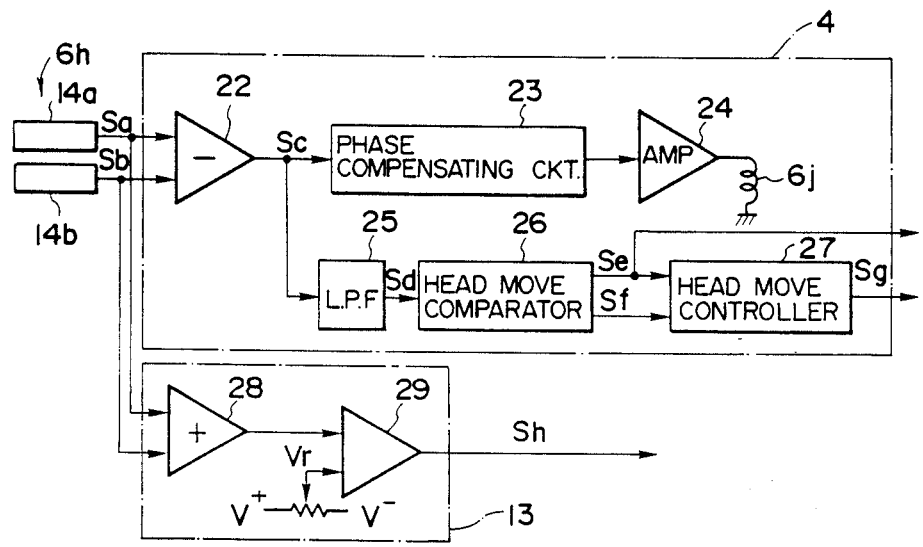
FIG. 13A  Sd
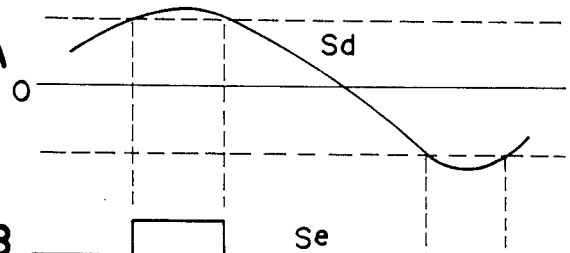
FIG. 13B  Se
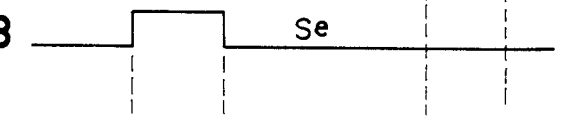
FIG. 13C  Sf
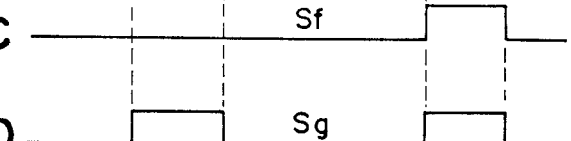
FIG. 13D  Sg
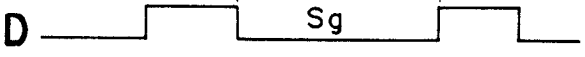

FIG.14C $E_h$

FIG.15
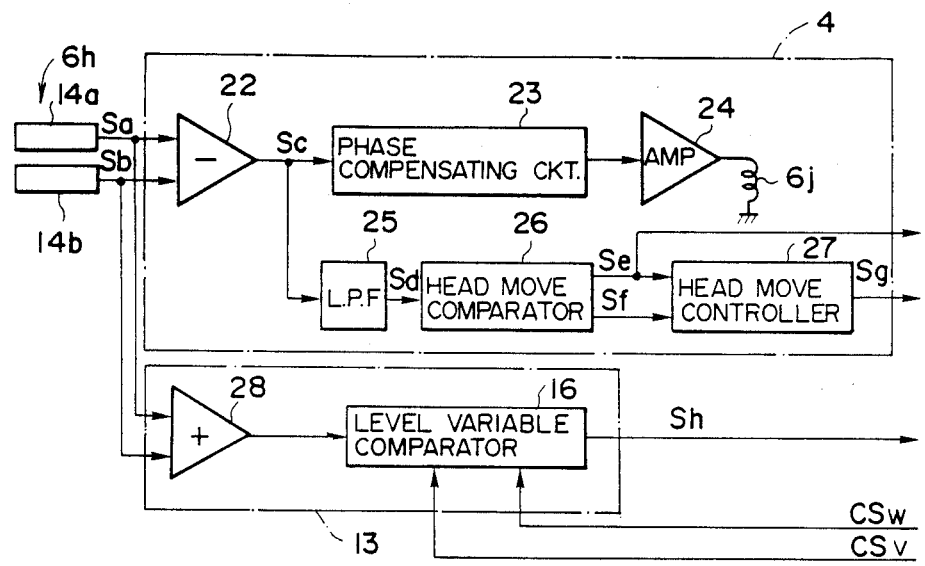
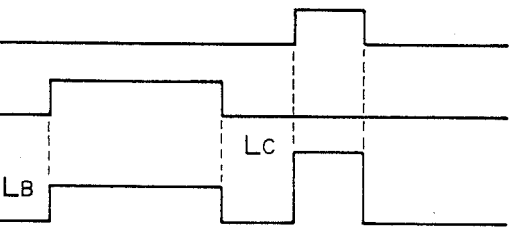
FIG.16A CSv
FIG.16B CSw
FIG.16C SENSITIVITY

FIG. 21
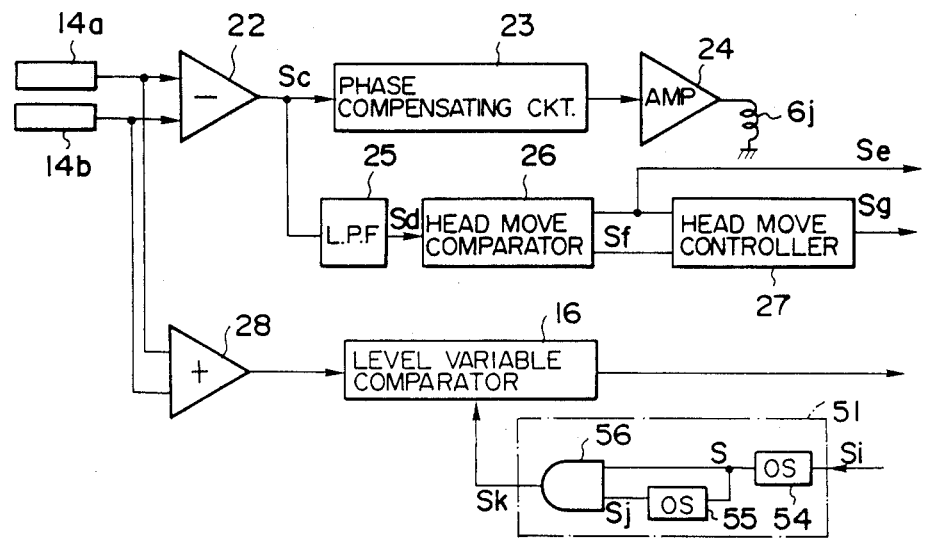
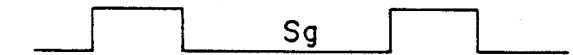
FIG. 22A — Sg
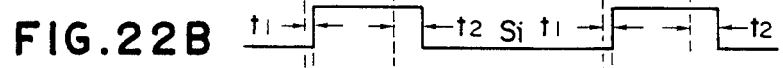
FIG. 22B — t1 t2 Si t1 t2
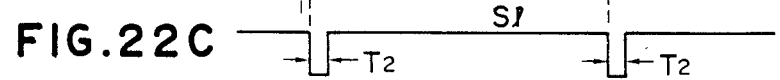
FIG. 22C — Sℓ T2 T2
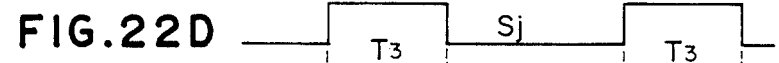
FIG. 22D — Sj T3 T3
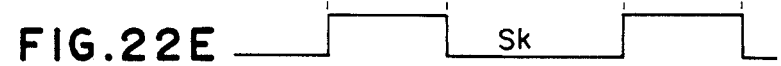
FIG. 22E — Sk

INFORMATION RECORDING AND/OR REPRODUCING APPARATUS PROVIDED WITH MEANS FOR DETECTING ABNORMALITY OF TRACKING SERVO

BACKGROUND OF THE INVENTION

1. Field of the Invention

This invention relates to an apparatus for applying a light beam to an optical recording medium having tracks provided thereon and effecting at least one of recording and reproduction of information while effecting tracking servo of the light beam.

2. Related Background Art

Various forms such as a disc-like form, a card-like form and a tape-like form are known as the forms of information recording medium for recording information thereon and reading out the information recorded thereon. Also, recently, attention has been paid to a method of applying a light beam condensed in the form of a spot to these mediums to thereby accomplish recording and reading-out of information, because of its capability of enhancing the recording density.

The manner of such recording will hereinafter be described by taking as an example a case where use is made of a card-like optical recording medium (hereinafter referred to as the optical card).

FIG. 1 of the accompanying drawings is a schematic plan view of the optical card, and FIG. 2 of the accompanying drawings is a fragmentary enlarged view thereof.

In FIG. 1, the letter C designates the optical card, the reference numeral 72 denotes information tracks, and the reference numeral 73 indicates the home position. Information is recorded as optically detectable record pit rows (information tracks) on the optical card C by causing a light beam modulated in accordance with recording information and reduced to a minute spot to scan the card C. At this time, to record or reproduce information accurately without causing any trouble such as crossing of the information tracks 72, it is necessary to control the applied position of the light beam in a direction perpendicular to the scanning direction (auto tracking, hereinafter referred to as AT). Also, to apply the minute spot stably in spite of the bending and mechanical error of the optical card, it is necessary to control the applied position of the light beam in a direction perpendicular to the optical card (auto focusing, hereinafter referred to as AF). As shown in FIG. 2, tracking tracks 75 ($75_1$, $75_2$, ...) for effecting the aforementioned AT are provided between the information tracks 72 ($72_1$, $72_2$, ...) of the optical card C.

A method of recording information on the optical card will now be described.

In FIG. 1, the light beam is at first positioned at the home position 73. The light beam is then moved in the direction of arrow D to seek an information track $72_n$ to be recorded, and scans the information track $72_n$ in the direction of arrow F, thereby accomplishing recording or reproduction of information. Track numbers are recorded on the information tracks 72, and by reproducing this information, the information track being currently recorded can be known. Also, recording of information is carried out in the fashion of a post script, i.e., in the order of the information tracks $72_1$, $72_2$, ..., $72_n$.

FIG. 3 of the accompanying drawings is a block diagram showing the construction of an information recording-reproducing apparatus for the optical card as described above.

In FIG. 3, a system controller 1 controls motors 2 and 3 and AT and AF servo circuits 4 and 5 to thereby control recording or reproduction of information on the optical card C.

The motor 2 reciprocally, moves the optical card C in the direction of double-headed arrow a, whereby a light beam is applied from an optical head 6 along the information tracks of the optical card C. The motor 3 is for moving the optical head 6 in a direction perpendicular to the information tracks on the optical card C.

The optical head 6 has a light source 6a comprising a semiconductor laser, a collimator lens 6b for collimating the light beam from the light source 6, a beam splitter 6c and an objective lens 6d, and applies a light beam for recording/reproduction onto the recording surface of the optical card C.

The optical head 6 also has a beam splitter 6e, condensing lenses 6f and 6g, and photoelectric converters 6h and 6i. The light beam reflected on the recording surface of the optical card C is received by the photoelectric converters 6h and 6i and converted into electrical signals thereby, and the electrical signals are supplied to the AT servo circuit 4 and the AF servo circuit 5, respectively.

The AT servo circuit 4 and the AF servo circuit send driving currents to the tracking coil 6j and focusing coil 6k of the optical head 6 to thereby move the objective lens 6d and effect AT and AF control.

The basic construction of such an information recording-reproducing apparatus is disclosed, for example, in U.S. Pat. No. 4,912,697.

Now, in the apparatus as described above, when a defect or defects are present on the recording medium or when an external shock is applied to the recording medium, there sometimes occurs abnormality to the tracking servo (that is, the phenomenon that AT deviates and the light beam does not correctly trace the information tracks). When such AT deviation occurs, the objective lens moves randomly, and this has led to the possibility of damaging the optical head. Also, particularly when AT deviation occurs during recording, the light spot strays on the medium, and this has led to the problem that information is superposedly written on the recorded information to cause the latter information to disappear.

SUMMARY OF THE INVENTION

It is the object of the present invention to solve the above-noted problems peculiar to the prior art and to provide an information recording and/or reproducing apparatus in which damage of an optical head and disappearance of recorded information do not occur in spite of the presence of a defect or defects of a medium or shock to the medium.

The above object of the present invention is achieved by providing means for detecting abnormality of tracking servo in an apparatus for applying a light beam to an optical recording medium having tracks provided thereon and effecting at least one of recording and reproduction of information while effecting tracking servo of the light beam. Such abnormality of tracking servo is detected, for example, from the velocity of movement of an objective lens. Also, AT deviation can be detected from a reduction in the quantity of light received by a photodetector for detecting a tracking error signal.

BRIEF DESCRIPTION OF THE DRAWINGS

FIG. 8 is a block diagram showing another example of the construction of the AT abnormality detecting circuit shown in FIG. 4.

FIGS. 9A and 9B are wave form diagrams showing signals in various portions of the circuit shown in FIG. 8.

FIG. 10 is a block diagram showing still another example of the construction of the AT abnormality detecting circuit shown, in FIG. 4.

FIG. 12 is a block diagram showing an example of the construction of the AT servo circuit and AT abnormality detecting circuit shown in FIG. 11.

FIGS. 13A–13D are wave form diagrams showing signals in various portions of the circuit shown in FIG. 12.

FIGS. 14A–14C illustrate the construction and operation of the AT error level detecting circuit shown in FIG. 13.

FIG. 15 is a block diagram showing a modification of the AT servo circuit and AT abnormality detecting circuit shown in FIG. 11.

FIGS. 16A–16C are wave form diagrams showing signals in various portions of the circuit shown in FIG. 15.

FIGS. 20A–20D are wave form diagrams showing signals in various portions of the circuit shown in FIG. 19.

FIG. 21 is a block diagram showing another modification of the AT servo circuit and AT abnormality detecting circuit shown in FIG. 11.

FIGS. 22A–22E are wave form diagrams showing signals in various portions of the circuit shown in FIG. 21.

DESCRIPTION OF THE PREFERRED EMBODIMENTS

Figure 3:
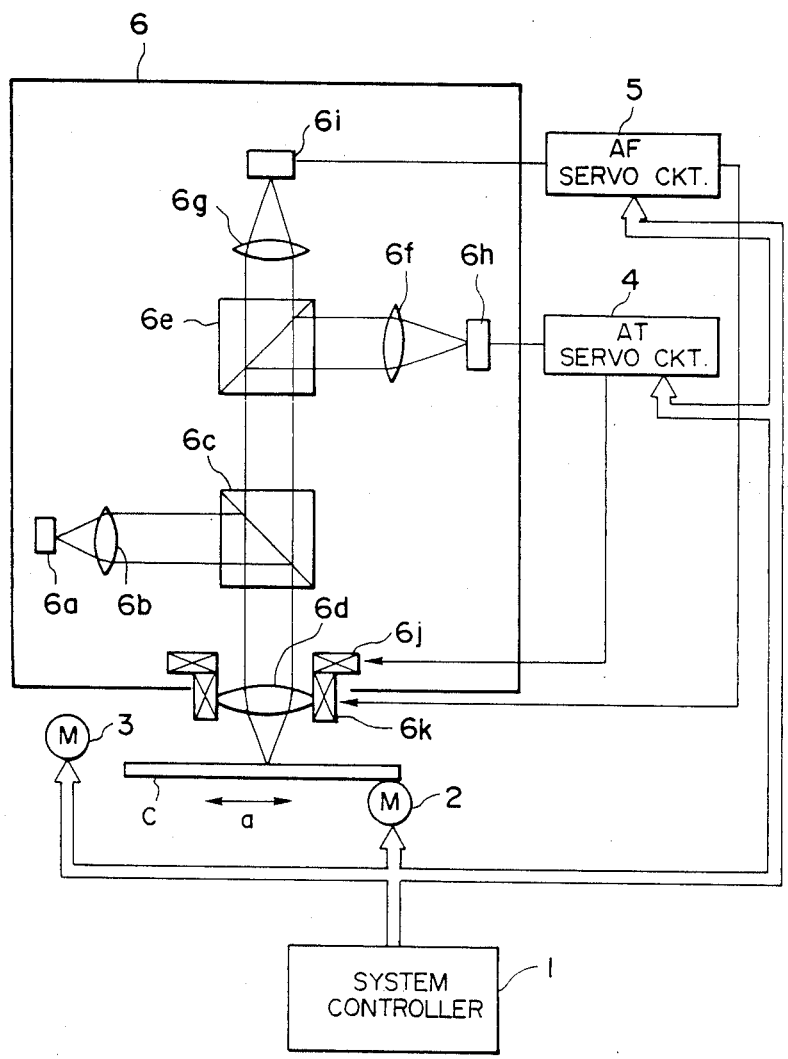
FIG. 3 is a block diagram showing an example of the construction of an information recording-reproducing apparatus according to the prior art.
Figure 4:
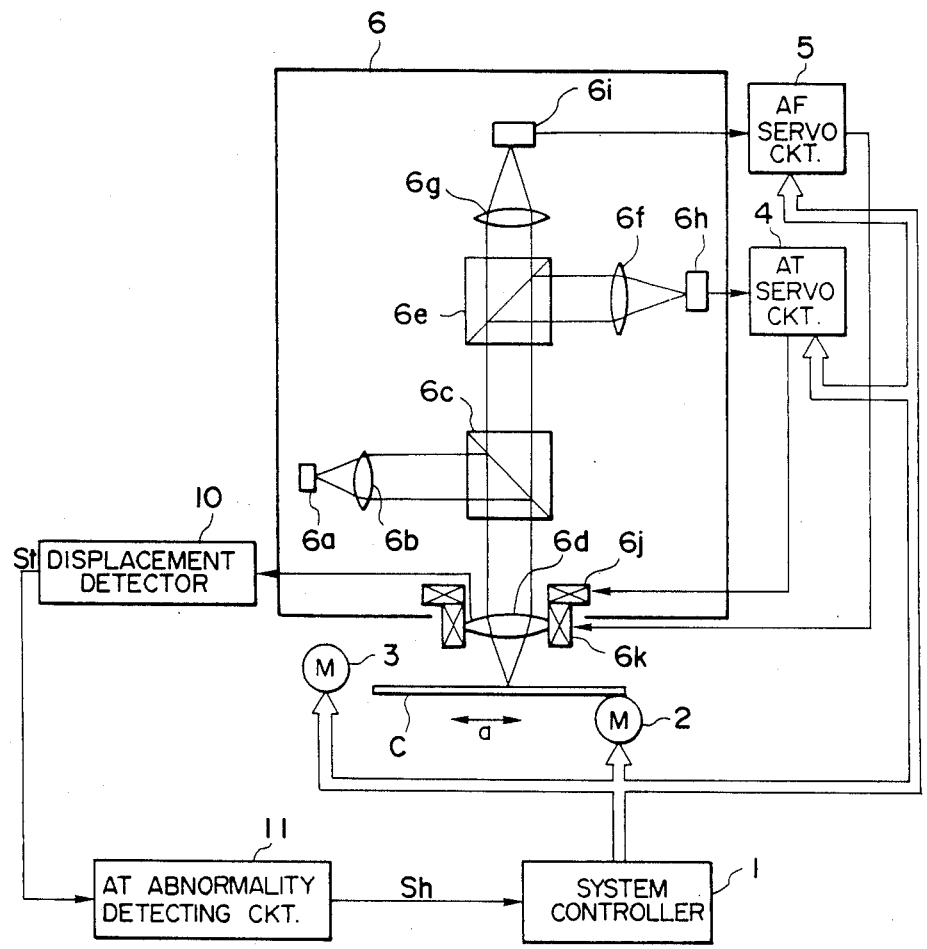
FIG. 4 is a block diagram showing the construction of an embodiment of the information recording-reproducing apparatus of the present invention.

FIG. 4 is a block diagram showing an embodiment of the information recording-reproducing apparatus of the present invention. In FIG. 4, members similar to those in FIG. 3 are given similar reference characters and need not be described in detail.

The present embodiment differs from the example shown in FIG. 3 in that a displacement detector 10 is provided. The displacement detector 10 serves to detect the amount of displacement of an objective lens $6d$ caused by a tracking coil $6j$, and the detection output St thereof is supplied to an AT abnormality detecting circuit 11, whereby the presence of abnormality of tracking is discriminated.

Figure 5:
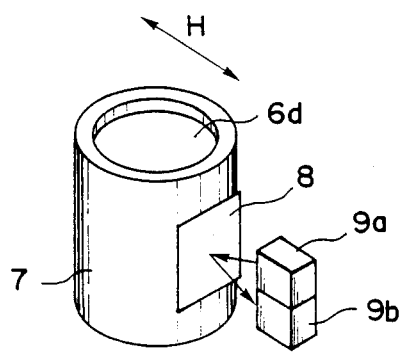
FIG. 5 is a schematic perspective view showing a specific example of the displacement detector shown in FIG. 4.

FIG. 5 is a schematic perspective view showing a specific example of the lens displacement detector 10. A barrel 7 holding an objective lens $6d$ is provided with a reflecting surface 8. A light is applied from a light-emitting diode $9a$ toward the reflecting surface 8, and the reflected light therefrom is received by a photodiode $9b$. When the objective lens $6d$ is moved in a direction H which is the tracking direction, the quantity of light received by the photodiode $9b$ varies. Accordingly, displacement of the objective lens $6d$ can be detected from the variation in the quantity of light.

Figure 6:
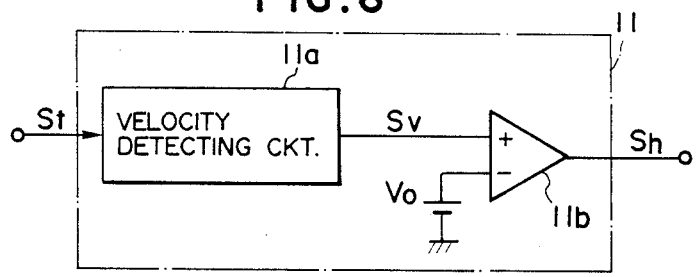
FIG. 6 is a block diagram showing an example of the construction of the AT abnormality detecting circuit shown in FIG. 4.
Figure 7A:
FIGS. 7A–7C are wave form diagrams showing signals in various portions of the circuit shown in FIG. 6.
Figure 7B:
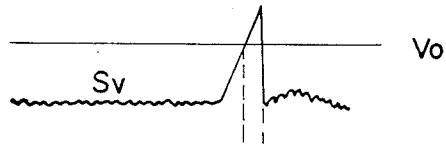
Figure 7C:
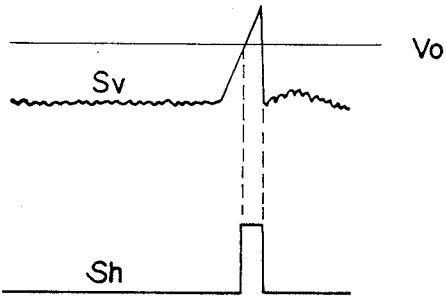

FIG. 6 is a circuit diagram showing the construction of the aforedescribed AT abnormality detecting circuit 11, and FIGS. 7A–7C are wave form diagrams for illustrating the operation thereof.

In FIG. 6, the output St (FIG. 7A) of the displacement detector 10 is input to a circuit $11a$ for detecting the relative velocity of the objective lens $6d$ and the optical head 6, and is input to a comparator $11b$ as a voltage signal Sv (FIG. 7B) proportional to the velocity. When the voltage signal Sv is greater than a comparative voltage $V_\phi$, that is, when the velocity of movement of the objective lens $6d$ is greater than a predetermined value $V_\phi$, the comparator $11b$ outputs a tracking abnormality detection signal Sh (FIG. 7C) to the system controller 1 and informs it of the abnormality. The system controller 1 immediately puts out a command for discontinuing recording and prevents superposition writing.

According to such a construction, it is detected in terms of the amount of displacement of the objective lens $6d$ per unit time that due to any external shock or to a defect or the like of the recording carrier itself, the objective lens $6d$ which is tracking has caused or has become likely to cause deviation from the track during recording or reproduction, and such deviation can be discriminated as the abnormality of tracking to thereby prevent malfunctioning.

The reason why the velocity detecting circuit $11a$ is provided to thereby detect the abnormality of tracking in terms of the magnitude of the amount of displacement of the objective lens $6d$ per unit time, i.e., the velocity, is that incorrect detection is effected if the abnormality of tracking is discriminated in terms of only the magnitude of the amount of displacement. That is, when the amount of displacement of the objective lens $6d$ from the neutral point has become large to a certain extent due to the low frequency vibration within the tracking draw-in range from the outside and the eccentricity and skew of the recording carrier, it is necessary to operate a motor 3 to move the optical head 6 and return the objective lens 6d to a predetermined range from the neutral point while tracking is maintained. The amount of displacement caused at this time is as large as the amount itself, but this does not mean abnormality of tracking. Accordingly, the velocity detecting circuit 11a is provided to detect the magnitude of the amount of displacement of the objective lens 6d per unit time, thereby preventing incorrect detection and accomplishing accurate control.

FIG. 8 is a circuit diagram showing another embodiment of the AT abnormality detecting circuit 11, and FIGS. 9A and 9B are wave form diagrams for illustrating the operation thereof.

In FIG. 8, the output St of the displacement detector 10 is input to a high-pass filter (HPF) 12a, and only frequency components greater than a predetermined frequency are extracted thereby and input as a signal Sf to comparators 12b and 12c (FIG. 9A). The output Sf+ of the comparator 12b assumes a high level when the signal Sf is greater than a comparative voltage $V_1$, and the output Sf− of the comparator 12c assumes a high level when the signal Sf is smaller than a comparative voltage $V_2$. An OR circuit 12d outputs a tracking abnormality detection signal Sh to the system controller 1 (FIG. 9B) if one of the signals Sf+ and Sf− is at a high level and informs it of the abnormality.

FIG. 10 shows an embodiment in which a differential circuit 13a is provided instead of the high-pass filter 12a of FIG. 8, and this embodiment is identical to the embodiment of FIG. 8 in the other points.

Again in the present embodiment, the amount of displacement of the output St of the displacement detector 10 per unit time is detected and if there is any abnormality, the system controller 1 is informed of it.

Figure 11:
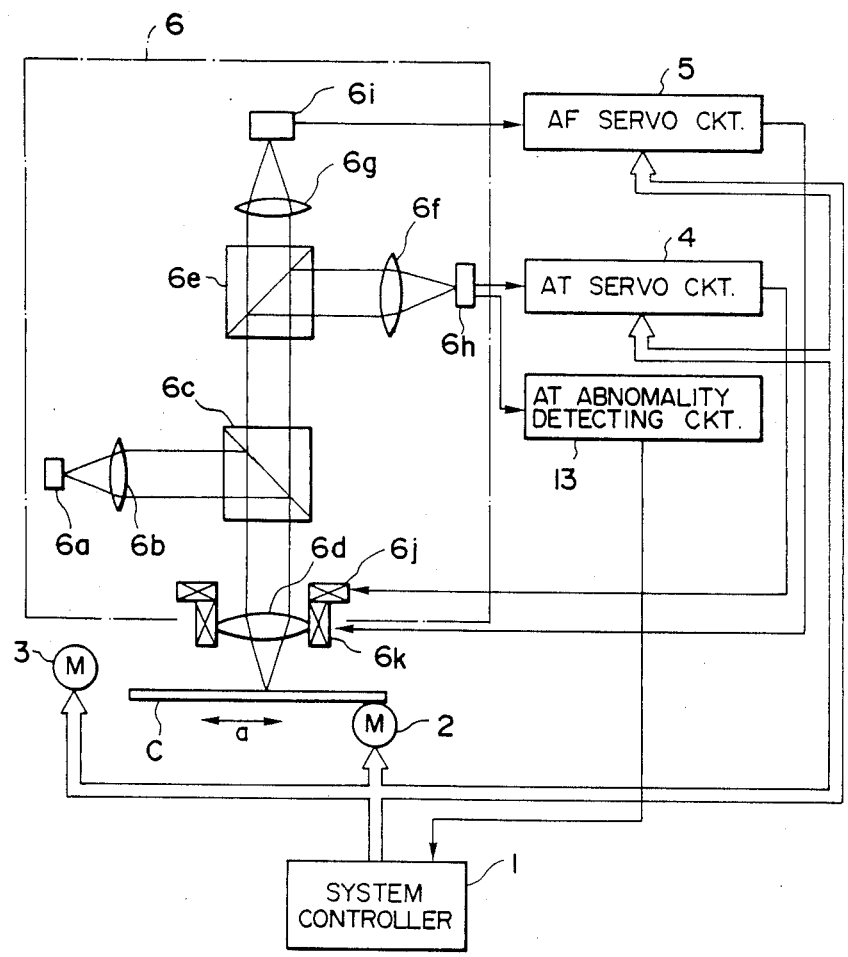
FIG. 11 is a block diagram showing the construction of another embodiment of the information recording-reproducing apparatus of the present invention.

FIG. 11 is a block diagram showing another embodiment of the information recording-reproducing apparatus of the present invention. In FIG. 11, members similar to those in FIG. 3 are given similar reference characters and need not be described in detail.

The present embodiment is similar in construction to the embodiment of FIG. 4 with the exception that instead of the detection of abnormality of tracking by the displacement detecting circuit 10 and the AT abnormality detecting circuit 11, the amount of displacement per unit time of a signal indicative of the sum of the quantities of light received by a photoelectric converter 6h which supplies a signal to the AT servo circuit 4 is detected by an AT abnormality detecting circuit 13 and a tracking abnormality detection signal is output to the system controller 1.

FIG. 12 is a block diagram showing an example of the construction of the AT servo circuit 4 and the AT abnormality detecting circuit 13 in the apparatus of FIG. 11, and FIGS. 13A–13D are wave form diagrams for illustrating the operation thereof.

In FIG. 12, the outputs Sa and Sb of the two divisional light-receiving portions of the photoelectric converter 6h are differentiated by a differential amplifier 22 and extracted as a tracking error signal Sc. The tracking error signal Sc is appropriately phase-compensated by a phase compensating circuit 23 and drives the aforementioned tracking coil 6j through an amplifier 24.

The tracking error signal Sc is also input to a low-pass filter (LPF) 25. When the objective lens 6d deviates from the neutral point of the actuator, the DC component Sd (FIG. 13A) of the tracking error signal Sc increases corresponding to the distance of the deviation and therefore, the LPF 25 passes only the DC component Sd therethrough and inputs it to a head move comparator 26. In which direction of the AT actuator the objective lens deviates is detected in the comparator 26, and a signal Se (FIG. 13B) or a signal Sf (FIG. 13C) is input to a head move controller 27 in conformity with the direction of the deviation, and the head move controller outputs an optical head driving signal Sg (FIG. 13D). The signal Se is also utilized as a head direction signal, and is output to the system controller 1 as a command signal for moving the optical head 6 in a predetermined direction, with the signal Sg.

Also, the outputs Sa and Sb of the light-receiving points 14a and 14b are added together and amplified by an addition amplifier circuit 28 and input to a comparator 29. The comparator 29 compares the quantity of light with a comparative voltage Vr as to whether the quantity of light is within a predetermined range, and outputs a tracking abnormality detection signal Sh to the system controller 1 and informs it of the abnormality when the quantity of light is reduced. The system controller 1 immediately puts out a command for discontinuing recording and prevents superposition writing.

Figure 14:
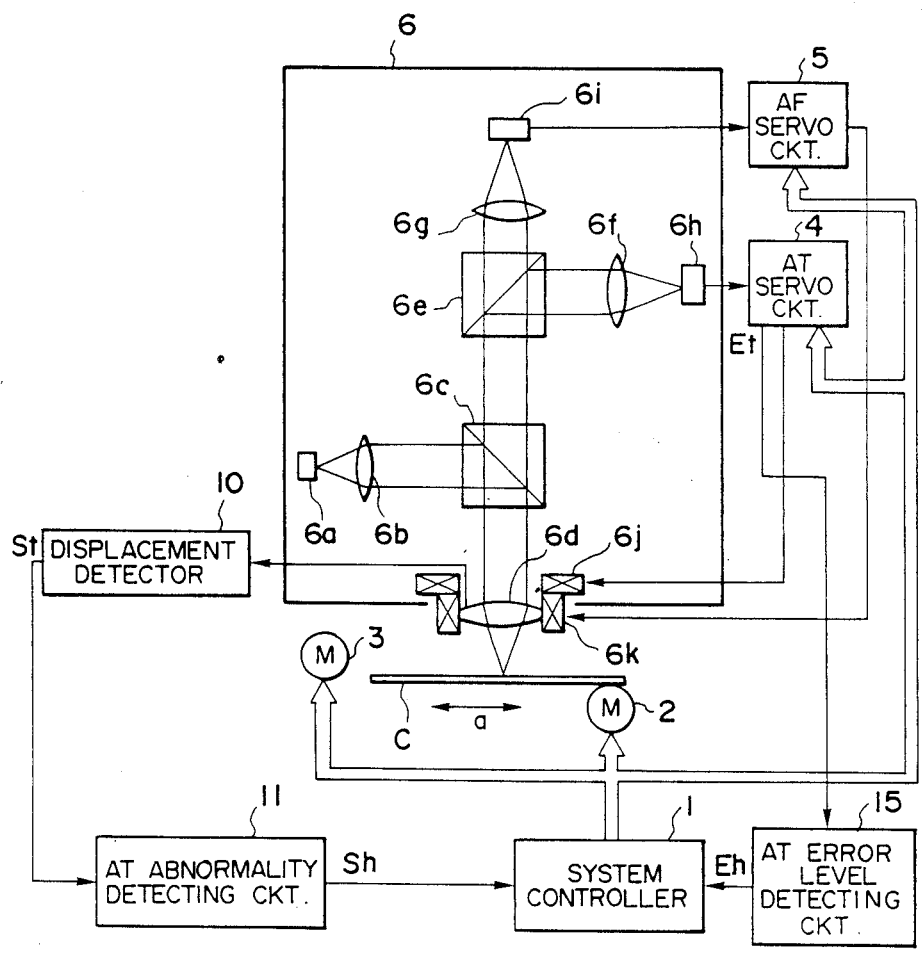
FIG. 14 is a block diagram showing the construction of still another embodiment of the information recording-reproducing apparatus of the present invention.

FIG. 14 is a block diagram showing still another embodiment of the information recording-reproducing apparatus of the present invention. In FIG. 14, members similar to those in FIG. 4 are given similar reference characters and need not be described in detail.

In the present embodiment, an AT error level detecting circuit 15 is provided to discriminate whether a tracking error signal ET output from the AT servo circuit 4 is above a predetermined level, and when the signal Et exceeds the predetermined value, a signal Eh is output to the system controller 1, and the present embodiment is similar to the embodiment of FIG. 4 in the other points.

In the present embodiment, by such construction, even when a relative variation occurs between the recording carrier and the optical head body due to disturbance such as external vibration and the AT abnormality detecting circuit 11 detects AT abnormality, if the output of the tracking error signal is within a predetermined error range, that is, if the light spot is within a degree in which it can follow the information tracks, the AT abnormality detection output is regarded as invalid and the operation of the system is continued.

Figure 14A:
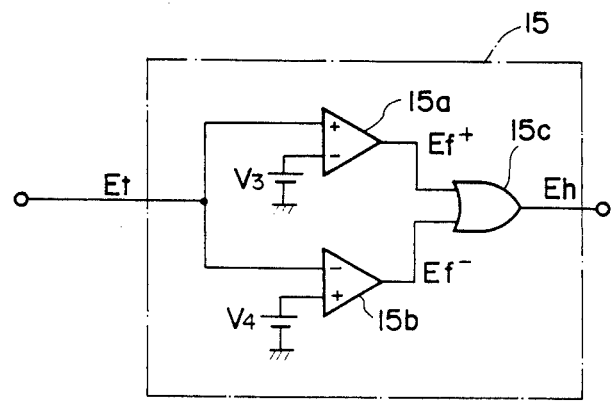
Figure 14B:
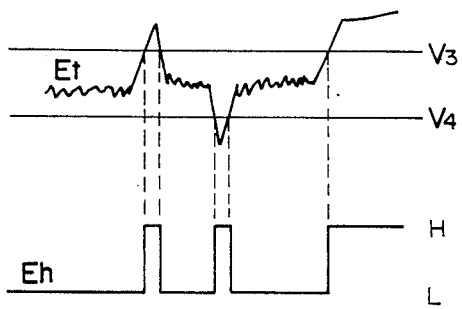

FIG. 14A is a circuit diagram showing the construction of the AT error level detecting circuit 15, and FIGS. 14B and 14C are wave form diagrams for illustrating the operation thereof.

In FIG. 14A, a tracking error signal Et (FIG. 14B) is input to comparators 15a and 15b. The output Ef+ of the comparator 15b assumes a high level when the signal Et is greater than a comparative voltage $V_3$, and the output Ef− of the comparator 15c assumes a high level when the signal Et is smaller than a comparative voltage $V_4$. If one of the signals Ef+ and Ef− is at a high level, an OR circuit 15d judges that the amount of tracking error exceeds a predetermined value, and outputs an AT error detection signal Eh (FIG. 14C) to the system controller 1.

The system controller 1 judges AT abnormality only when both the tracking abnormality detection signal Sh from the AT abnormality detecting circuit 11 and the AT error detection signal Eh from the AT error level detecting circuit 15 assume a high level, and immediately effects control such as discontinuing the operation of various parts.

Now, in an apparatus which effects recording and reproduction, the required sensitivity of AT abnormality detection differs depending on each mode. For example, during recording, the risk of information disappearance by AT deviation is high and therefore, it is necessary to detect AT deviation with a higher sensitivity than during reproduction. Also, in the operation (verification) of reproducing information immediately after recording and comparing it with the recording information to thereby confirm whether correct recording has been effected, a high AT deviation detecting ability is required. Description will hereinafter be made of an embodiment in which to meet such requirements, the AT abnormality detecting sensitivity is changed over in conformity with each operation mode.

FIG. 15 is a block diagram showing a modification of the AT servo circuit and AT abnormality detecting circuit shown in FIG. 11. In FIG. 15, members similar to those in FIG. 12 are given similar reference characters and need not be described in detail. FIGS. 16A-16C are wave form diagrams for illustrating the operation of the circuit shown in FIG. 15.

The circuit shown in FIG. 15 uses a level variable comparator 16 instead of the comparator 29 in the embodiment of FIG. 12. This comparator 16 is designed such that the level of the reference value to be compared with the output of the addition amplifier 28 is changed over by change-over signals $CS_W$ and $CS_V$. The change-over signal $CS_W$ is a signal output from the system controller to change over the sensitivity during recording and during reproduction, and the change-over signal $CS_V$ is a signal output from the system controller to change over the sensitivity during the verification after recording.

By such a construction, the AT abnormality detecting sensitivity (FIG. 16C) of the detecting circuit 10 is changed over in conformity with the change-over signal $CS_V$ (FIG. 16A) and the change-over signal $CS_W$ (FIG. 16B). When at each sensitivity, a signal exceeding a predetermined level is input, such signal is output as an AT abnormality detection signal Sh to the system controller. When the sensitivity during reproduction is $L_A$ and the sensitivity during recording is $L_B$ and the sensitivity during verification is $L_C$, the sensitivities are set so that $L_A < L_B < L_C$ (FIG. 16C).

As described above, according to the present embodiment, the sensitivities during recording and during verification are set higher than the sensitivity during reproduction, thereby, a track, from which AT control may deviate during reproduction or a track which cannot be normally reproduced during reproduction because during recording, recording has been effected in a measured manner due to extraneous shock or the like, although AT control has not deviated, is detected in advance during recording and during verification and regular recording is not effected on such a track. Rather, re-recording is effected on the next track to thereby secure reliability so as to enable the recorded data to be reproduced without fail.

Figure 17:
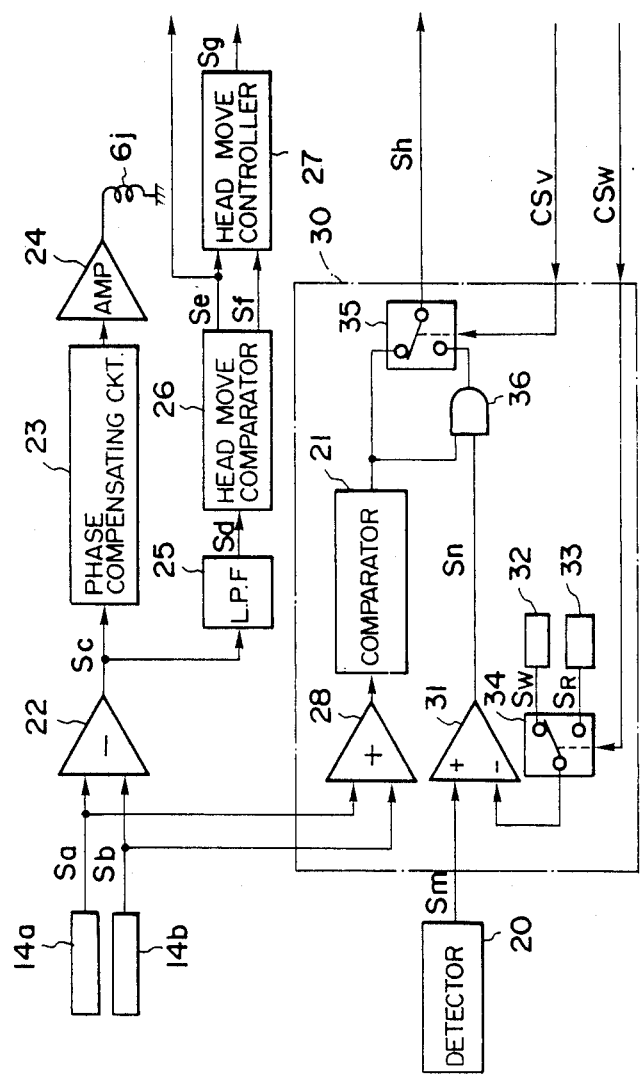
FIGS. 17–19 are block diagrams showing further modifications of the AT servo circuit and AT abnormality detecting circuit shown in FIG. 1.

FIG. 17 is a block diagram showing another embodiment of the AT abnormality detecting circuit in which the sensitivity can be changed over.

This embodiment is similar in construction to the embodiment of FIG. 15, except provided are a detector 20 for detecting the velocity of movement of the objective lens 6d in the AT direction and an AT abnormality detecting circuit 30 to which the signal from the detector 20 is input.

The AT abnormality detecting circuit 30 comprises, in addition to an addition amplifier circuit 28 and a comparator 21 for comparing the output of the circuit 28 with a reference value, a comparator 31, judgment signal generators 32 and 33, change-over switches 34 and 35 and an AND circuit 36.

The output of the detector 20 is input to one terminal of the comparator 31, and judgment signals $S_W$ and $S_R$ are input from the judgment signal generators 32 and 33 to the other terminal of the comparator 31 through the change-over switch 34. The change-over switch 34 is changed-over by a change-over signal $CS_W$, and inputs the signal $S_W$ to the comparator 31 during recording, and inputs the signal $S_R$ to the comparator 31 during reproduction.

The output of the comparator 31, with the output of the comparator 21, is input to the AND circuit 36, the output of which is input to the change-over switch 35. The output of the comparator 21 is directly input to the other input of the change-over switch 35. The change-over switch 35 is changed over by a change-over signal $CS_V$, and outputs the output of the comparator 21 as the AT abnormality detection signal Sh to the system control during verification, and outputs the output of the AND circuit 36 as the AT abnormality detection signal Sh to the system controller during recording and during reproduction.

With such a construction, during recording, the change-over signal $CS_W$ becomes "1" and therefore, the change-over switch 34 is in its shown state, and the judgment signal $S_W$ is input to the comparator 31, which thus discriminates whether a signal Sm is greater than the signal $S_W$. If the signal Sm is greater than the signal $S_W$, the comparator 31 outputs a comparison signal Sn, and opens the AND circuit 36 to pass the output signal of the comparator 21 therethrough. At this time, the change-over switch 35 is changed over to the direction opposite to the shown direction because the change-over signal $CS_V$ becomes "0", and the output of the AND circuit 36 is output as the AT abnormality detection signal Sh.

During reproduction, the change-over signals $CS_W$ and $CS_V$ both become "0" and therefore, the change-over switch 34 is changed over to the direction opposite to the shown direction, and the signal Sm and the signal $S_R$ are compared by the comparator 31. If the signal Sm is greater than the signal $S_R$, the comparison signal Sn is output, and in the same manner as during recording, the output signal of the comparator 21 is output as the AT abnormality detection signal Sh through the AND circuit 36 and the change-over switch 35.

During verification, the change-over signal $CS_V$ becomes "1" and therefore, the change-over switch 35 assumes its shown state, and the output signal of the comparator 21 is directly output as the AT abnormality detection signal Sh.

Thus, according to the present embodiment, during recording or during reproduction, even if the comparator 21 outputs a detection signal, but if the velocity of movement of the objective lens is below a predetermined value, AT abnormality is not detected, and on the other hand, during verification, the output of the comparator 21 is directly output as the AT abnormality detection signal Sh, whereby the sensitivity of AT abnormality detection is changed over so as to be higher during verification than during recording and during reproduction.

Also, if the levels of the judgment signals $S_W$ and $S_R$ are set so that $S_W < S_R$, the sensitivity during recording becomes higher than the sensitivity during reproduction. Accordingly, any track which may not be normally reproduced during reproduction can be eliminated in advance during recording and during verification when the sensitivity is high.

Figure 18A:
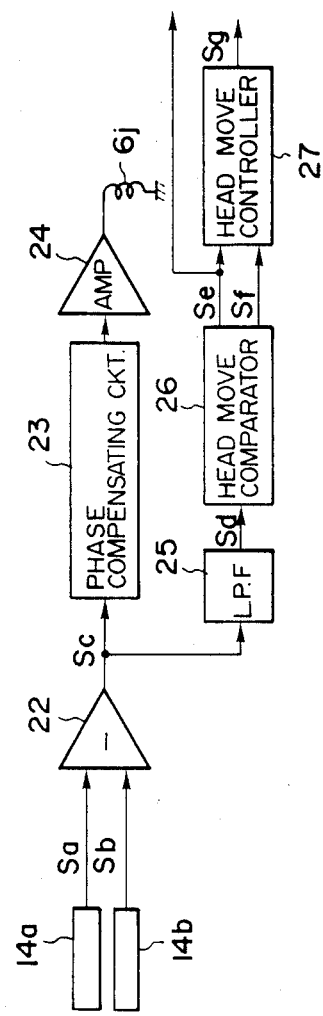
Figure 18B:
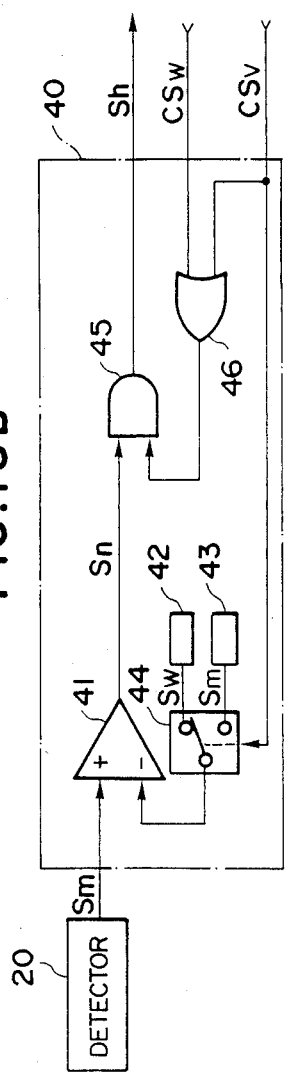

FIG. 18 is a block diagram showing still another embodiment of the AT abnormality detecting circuit in which the sensitivity can be changed over.

The present embodiment is similar in construction to the embodiment of FIG. 17 with the exception that a detector 20 for detecting the velocity of movement of the objective lens 6d in the AT direction is provided and the AT abnormality detecting circuit 40 is designed to detect AT deviation by only the judgment of the velocity of movement of the objective lens.

The AT abnormality detecting circuit 40 is comprised of a comparator 41, judgment signal generators 42 and 43, a change-over switch 44, an AND circuit 45 and an OR circuit 46.

The output of the detector 20 is input to one terminal of the comparator 41, and judgment signals $S_V$ and $S_W$ are input from the judgment signal generators 42 and 43 to the other terminal of the comparator 41 through the change-over switch 44. The change-over switch 44 is changed over by the change-over signal $CS_V$, and imputs a signal $S_V$ to the comparator 41 during verification, and inputs a signal $S_W$ to the comparator 41 during the other times.

The output of the comparator 41 is supplied to the AND circuit 45, is gated by the output signal of the OR circuit 36 which takes the logic sum of the change-over signals $CS_W$ and $CS_V$, and is output to the system controller.

According to such a construction, during recording, the change-over signal $CS_W$ becomes "1" and the change-over signal $CS_V$ becomes "0" and therefore, the change-over switch 44 assumes a state converse to the state shown, and the judgment signal $S_W$ is input to the comparator 41, by which the signal Sm is compared with the signal $S_W$. If the signal Sm is greater than the signal $S_W$, a comparison signal Sn is output to the AND circuit 45. Since the output of the OR circuit 46 is "1", the comparison signal Sn is output as an AT abnormality detection signal Sh.

During verification, the signal $CS_V$ becomes "1" and the signal $CS_W$ becomes "0" and therefore, the change-over switch 44 assumes its shown state and the judgment signal $S_V$ is input to the comparator 41 and compared with the signal Sm, and in the same manner as during recording, the comparison signal Sn is output as an AT abnormality detection signal Sh.

During reproduction, the change-over signals $CS_W$ and $CS_V$ both become "0" and the AND circuit 45 is closed and therefore, the output of the comparator 41 is neglected.

Thus, according to the present embodiment, by setting the levels of the judgment signals $S_V$ and $S_W$ so that $S_V < S_W$, the sensitivity becomes higher during recording than during reproduction and higher during verification than during recording, and any track which ma not be normally reproduced during reproduction can be eliminated in advance during verification.

In the foregoing description, the change-over signals for recording, verification and reproduction have been described as being supplied to the AT control system by two signal lines, but alternatively, the change-over signals may be serially supplied by one signal line. Also, change-over of the AT sensitivity is effected in the AT control system, but alternatively, the AT sensitivity may be made constant and the velocity information of the objective lens may be supplied to the system controller so that whether AT abnormality is received on the system controller side may be judged with a result that change-over of the sensitivity is effected.

On the other hand, in the information recording-reproducing apparatus as described previously, the operation of moving the optical head in the tracking direction is also effected with AT servo. While the optical head is thus being moved, vibration is exerted on the optical head and the objective lens sways greatly and therefore, AT abnormality is sometimes erroneously detected. Description will hereinafter be made of an embodiment which is designed so as to reduce the sensitivity of AT abnormality detection during the movement of the optical head in order to solve this problem.

Figure 19:
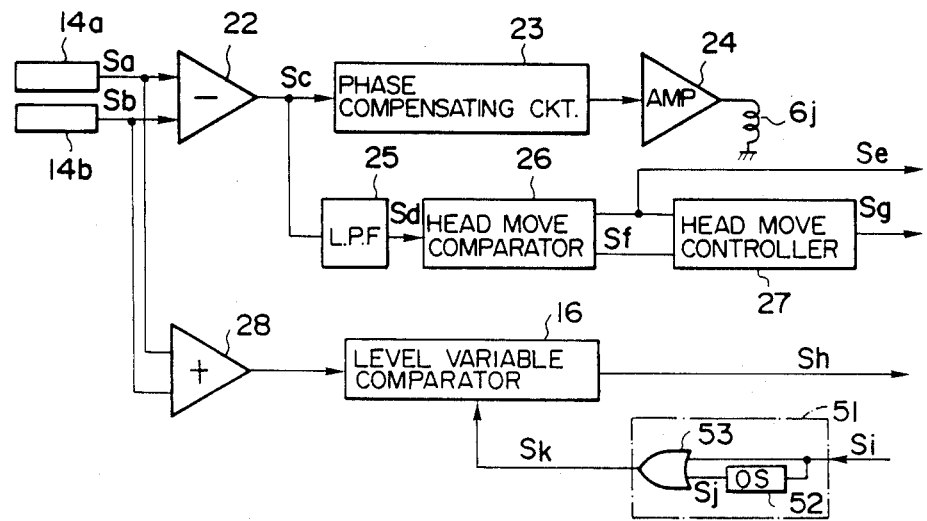
Figure 20A:
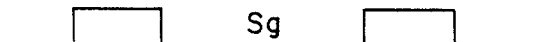
Figure 20B:
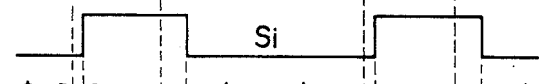
Figure 20C:
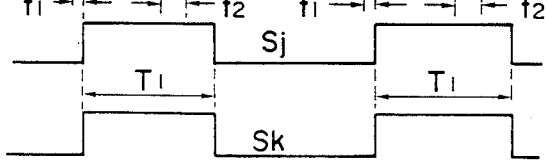

FIG. 19 is a block diagram showing a modification of the AT servo circuit and AT abnormality detecting circuit shown in FIG. 11. In FIG. 19, members similar to those in FIG. 15 are given similar reference characters and need not be described in detail. FIGS. 20A–20D are wave form diagrams illustrating the operation of the circuit shown in FIG. 19.

The circuit shown in FIG. 19 is such that in the embodiment of FIG. 15, the change-over signal input to the level variable comparator 16 is replaced by a signal Sk from a sensitivity change-over circuit 51. The sensitivity change-over circuit outputs this change-over signal Sk on the basis of an input signal Si. The signal Si (FIG. 20B) is formed on the basis of a signal Sg (FIG. 20A) output from the head move controller 27 to the system controller 1. This input signal Si is a signal output as an actual optical head driving signal from the system controller 1 to the optical head driving system, and has some delay time $t_1$ relative to the signal Sg and a delay time $t_2$ necessary for the optical head driving system.

The sensitivity change-over circuit 51 is comprised of a one-shot circuit 52 and an OR circuit 53. The signal Si is input to the input of the one-shot circuit 52, from which is output a one-shot signal Sj (FIG. 20C) triggered by the rising of the signal Si and assuming an "H" level only for a predetermined time $T_1$.

The OR circuit 53 takes the logic sum of the signal S and the signal Sj and outputs a sensitivity change-over signal Sk (FIG. 20D). The comparator 16 is controlled so that the detection sensitivity is reduced as long as the sensitivity change-over signal Sk is at an "H" level.

As described above, according to the present embodiment, the AT abnormality detection sensitivity is reduced as long as the optical head driving signal is output and for a predetermined time after the termination of the signal, whereby the erroneous detection of AT abnormality by the increase in vibration during the movement of the optical head (the outputting of an abnormality signal in spite of there being no abnormality) can be eliminated, and even if there occurs a deviation between the optical head driving signal and the actual driving system (a mechanical delay or the like), the detection sensitivity is reduced in a predetermined time after the termination, whereby erroneous detection of AT abnormality can be prevented and AT abnormality detection can be accomplished without malfunctioning and moreover, highly accurately.

FIG. 21 is a block diagram showing another embodiment of the AT abnormality detecting circuit in which the head movement is considered, and FIGS. 22A-22E are wave form diagrams for illustrating the operation thereof.

This embodiment is similar in construction to the embodiment of FIG. 19 with the exception of the construction of a sensitivity change-over circuit 51.

The sensitivity change-over circuit 51 in the present embodiment is comprised of a series circuit of one-shot circuits 54 and 55, and an AND circuit 56 for taking the AND condition of the outputs of the one-shot circuits 54 and 55.

The one-shot circuit 54 outputs a signal Sl (FIG. 22C) triggered by the rising of an input signal Si (FIG. 22B) and assuming an "L" level for a predetermined time $T_2$, and the one-shot circuit 55 outputs a signal Sj (FIG. 22D) triggered by the rising of the signal Sl and assuming an "H" level for a predetermined time $T_3$. The signals Sl and Sj thus obtained have their logic product taken by the AND circuit 56 and are input as a change-over signal Sk (FIG. 22E) to the level variable comparator 16.

According to such a construction, the AT abnormality detection sensitivity is reduced for the time $T_3$ from after the time $T_2$ from after the optical head driving signal begins to be output until the actual driving system starts to operate, until the driving system terminates its operation, whereby AT abnormalitiy detection can be accomplished highly accurately.

Figure 23:
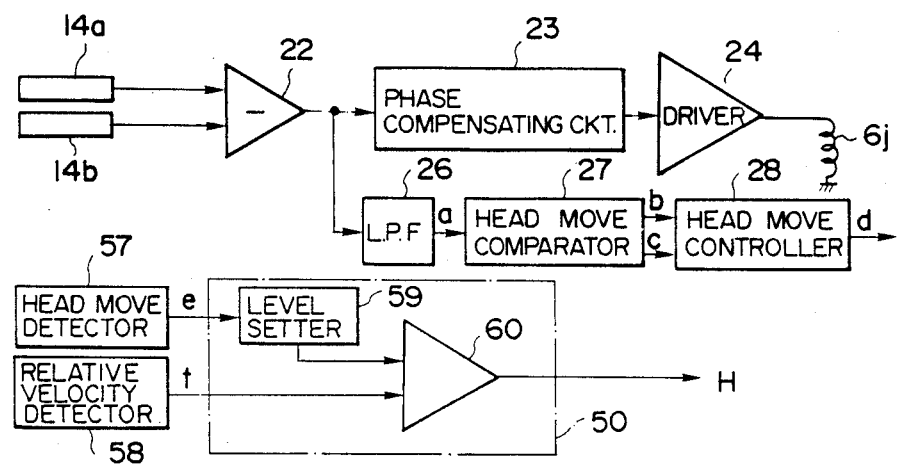
FIG. 23 is a block diagram showing a further modification of the AT servo circuit and AT abnormality detecting circuit shown in FIG. 11.
Figure 24:
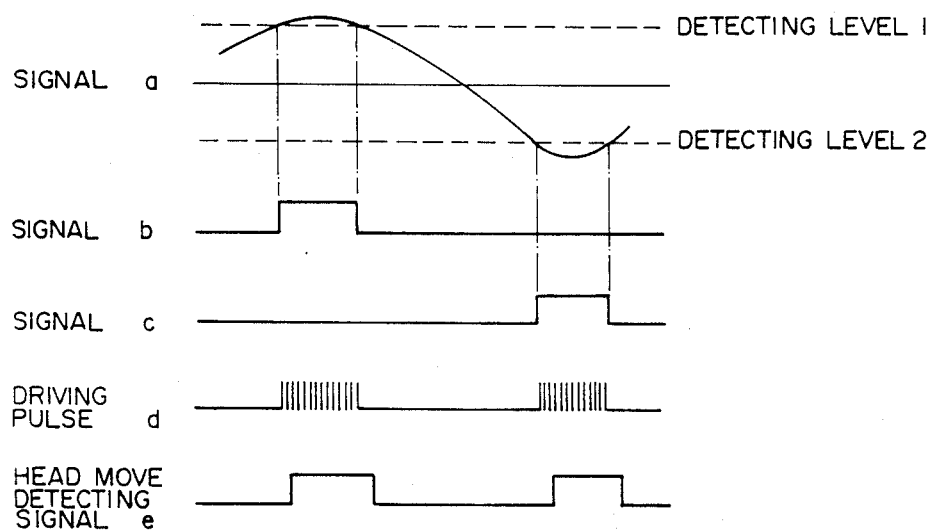
FIG. 24, consisting of a–e, is a wave form diagram showing signals in various portions of the circuit shown in FIG. 23.

FIG. 23 is a block diagram showing still another embodiment of the AT abnormality detecting circuit in which the head movement is considered, and FIG. 24 is a wave form diagram for illustrating the operation thereof.

In the present embodiment, the velocity of the objective lens relative to the optical head is detected by a relative velocity detector 58, and the output f thereof is compared with a reference value by a comparator 60 in the AT abnormality detecting circuit 50. When the objective lens is being moved at a velocity above a predetermined value, the comparator 60 outputs an AT abnormality signal H to the system controller.

A head move detector 57 comprising a potentiometer or the like detects whether the head is being moved, and outputs a head move detection signal e to a level setter 59. The level setter 59 sets a reference value on the basis of the head move detection signal e and outputs it to a comparator 60. The comparator 60 compares this reference value with a detection signal f from the relative velocity detector 58 and outputs the aforementioned AT abnormality signal H.

Description will now be made of the operation of the present embodiment having such a construction.

FIG. 24 is a signal wave form diagram for illustrating the operation of the present embodiment.

As described above, minute tracking control is accomplished by driving the AT actuator on the basis of the tracking error signal, and the deviation of the objective lens from the neutral position of the AT actuator attributable to track jump or skew or the like of tracks appears as a variation in a signal a obtained through the low-pass filter 26, as shown in FIG. 24.

Detection levels 1 and 2 are set in advance in the head move comparator 27, and comparison thereof with the signal a indicative of the deviation of the objective lens from the neutral position is effected. When the signal a exceeds the detection level 1, a signal b is output, and when the signal a exceeds the detection level 2, a signal c is output.

Accordingly, depending on which one of the signals b or c is input, the head move controller 28 can discriminate in which direction the objective lens deviates from the neutral position of the AT actuator. A head move requiring pulse d is then output to the system controller to thereby rotate a head feed motor, whereby the head is moved so that the objective lens may be returned to the neutral position.

When the head is thus moved, the amount of displacement of the light beam spot in the direction transverse to the tracks is detected, and a detection signal e is output from the head move detector 57.

When the head move detection signal e is input, the level setter 59 causes the reference value of the comparator 60 to rise above the usual level and reduces the AT abnormality detection sensitivity. Thus, even if the relative velocity between the objective lens and the head resulting from the movement of the head is detected by the relative velocity detector 58 and a signal f is output, the AT abnormality signal H is not output, because the reference value has risen.

Conversely, when the usual AT operation is performed with the head being stationary or nearly stationary and the head move detection signal e is not output, the level setter 59 sets the reference value to the usual level and outputs it to the comparator 60. The usual level thus set is a level at which the velocity of movement of the head during the usual AT operation which is the nearly stationary state of the head can be neglected.

Thereby, the tolerance of the signal f from the relative velocity detector 58 becomes narrow and the AT abnormality detection sensitivity rises.

That is, if the relative velocity of the head and the objective lens is a predetermined relative velocity within the AT accuracy range by the AT actuator 6j, it is not judged as AT abnormality, but when the tracking deviates or is about to deviate due to the extraneous shock or the defect or the like of the information recording carrier, the AT abnormality signal H is output from the comparator 60 on the spot.

Thus, by providing the level setter 59 for changing over the AT abnormality detection sensitivity to a low level in order to detect whether the head is being moved and to prevent malfunctioning if the head is being moved, and changing over the AT abnormality detection sensitivity to a high level if the head is not being moved, it becomes possible to accomplish highly stable and highly accurate AT abnormality detection.

Figure 25:
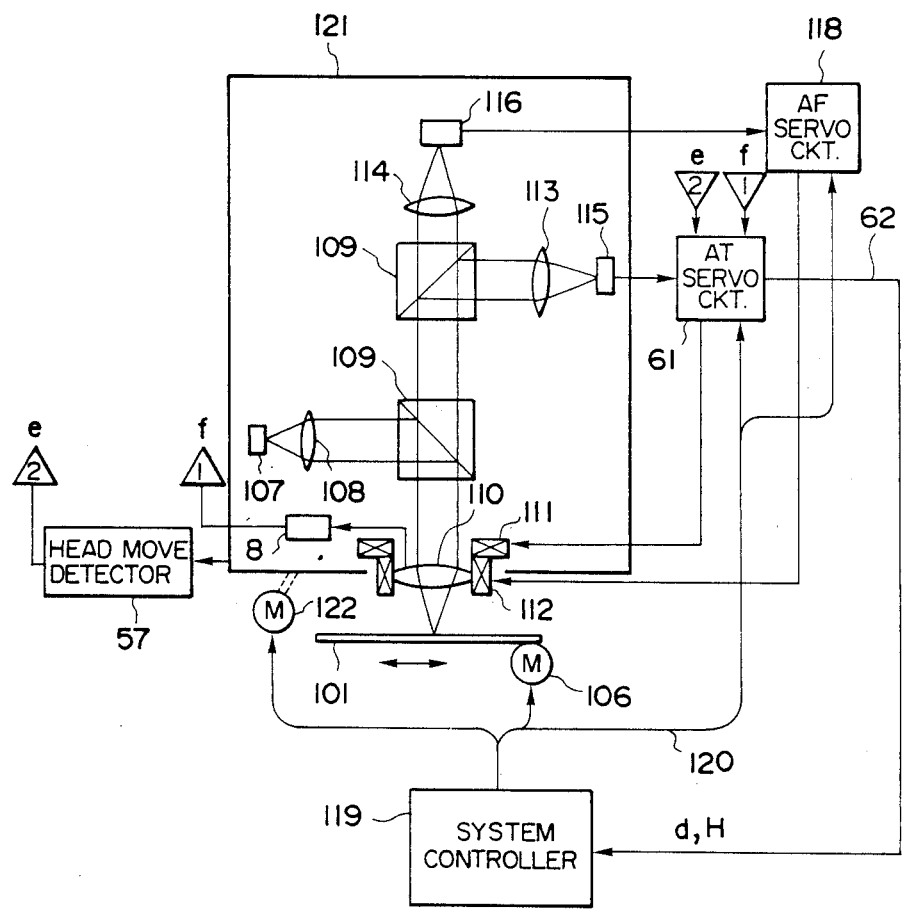
FIGS. 25 and 26 are block diagrams showing the constructions of further embodiments of the information recording-reproducing apparatus of the present invention.

FIG. 25 schematically shows the construction of an optical card recording-reproducing apparatus to which the circuit shown in FIG. 23 is applied.

In FIG. 25, an optical card 101, is mounted for movement in the direction of the double-head arrow by a motor 106. An optical head 121 is movable in a direction perpendicular to the track scanning direction by a head feed motor 122.

An objective lens 110 movable relative to the optical head 121 is provided in the optical head 121, and the objective lens 110 is driven by an AT actuator 111 and an AF actuator 112. The velocity of the movement of the objective lens 110 relative to the optical head 121 is detected by the relative velocity detector 58 and is output as a signal f to the AT servo circuit 61 of the construction as shown in FIG. 23.

Also, the movement of the optical head 121 is detected by the head move detector 57 and is output as a detection signal e to the AT servo circuit 61.

A light source 107 such as a semiconductor laser is provided in the optical head 121, and the light from the light source 107 is reflected by a beam splitter 109 through a collimator lens 108, is condensed by the objective lens 110 and irradiates the optical card 101 in the form of a spot. The reflected light from the optical card passes through the objective lens 110 and the beam splitter 109 and is caused by condensing lenses 113 and 114 to enter a sensor 115 for AT and a sensor 116 for AF.

The sensor 115 for AT corresponds to the sensors 14a and 14b in FIG. 23. The output of the sensor 115 for AT is input to the AT servo circuit 61, which in turn drives the AT actuator 111 to effect tracking control. Further, the AT servo circuit 61 outputs the aforementioned head move requiring pulse, AT abnormality signal H, etc. to a system controller 119.

That is, the AT servo circuit 61 includes the phase compensator 23, the driver 24, the low-pass filter 26, the head move comparator 27, the head move controller 28 and the AT abnormality detecting circuit 5 shown in FIG. 23.

The output of the sensor 116 for AF is input to an AF servo circuit 118, which in turn drives the AF actuator 112 to effect focusing control.

The system controller 119 effects, in addition to the driving control of the optical card feed motor 106 and the head feed motor 122, the control of the entire system including the AT servo circuit 61 and the AF servo circuit 118.

The tracking operation of this recording-reproducing apparatus is as described above. That is, when the objective lens 110 deviates from the neutral position of the AT actuator 111 by a predetermined distance or greater, the AT servo circuit 61 detects the direction of deviation by the head move comparator 7, outputs the head move requiring pulse d to the system controller 119 and drives the head feed motor 122.

Further, when the optical head 121 is being moved, the AT servo circuit 61 reduces the AT abnormality detection sensitivity by the detection signal e input from the head move detector 57, thereby preventing incorrect detection. Conversely, when the optical head 121 is stationary or nearly stationary, the AT servo circuit 61 elevates the AT abnormality detection sensitivity to the usual level, thereby effecting highly accurate AT abnormality detection.

In the present embodiment, the output signal e of the head move detector 57 is input to the AT abnormality detecting circuit 50 of the AT servo circuit 61, but alternatively, it may be input to the system controller 119 to thereby effect a similar AT abnormality detecting operation.

Also, in the present embodiment, the head move detector 57 is used for the head move detection, but alternatively, the head move requiring pulse d may be used to form a signal approximate to the detection signal e by a delay circuit or the like. In such a case, the head move detector 57 will become unnecessary.

Figure 26:
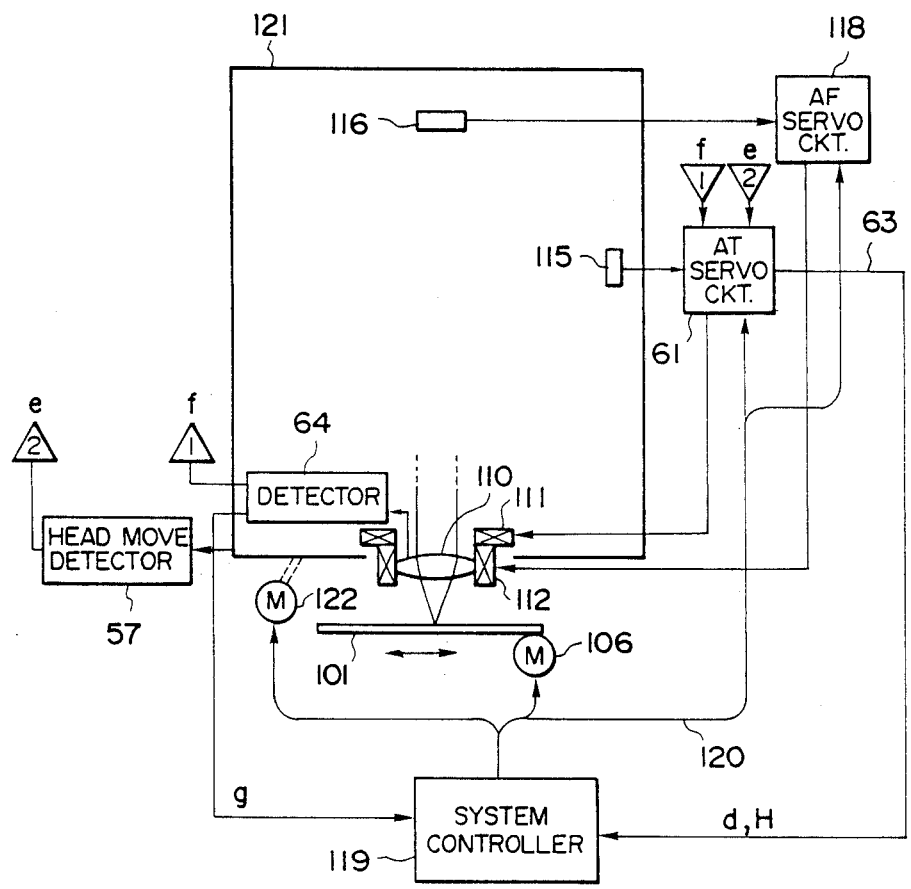
Figure 27:
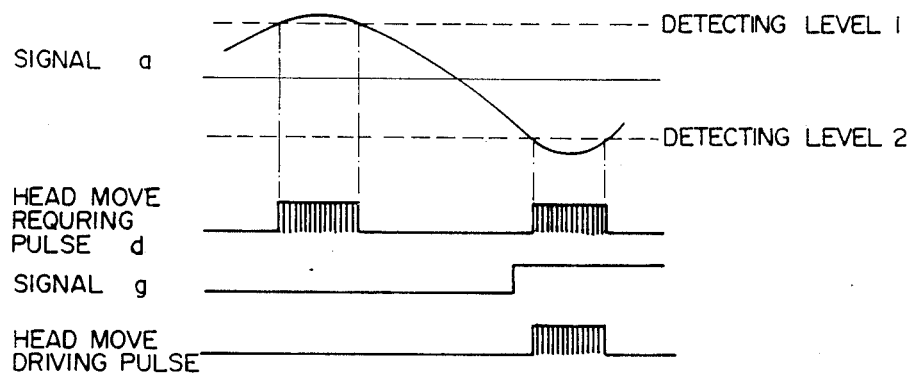
FIG. 27 is a wave form diagram showing signals in various portions of the apparatus shown in FIG. 26.

FIG. 26 is a schematic diagram showing a modification of the optical card recording-reproducing apparatus shown in FIG. 25, and FIG. 27 is a signal wave form diagram for illustrating the tracking operation thereof.

In the present embodiment, as shown in FIG. 26, there is provided a detector 64 for outputting the relative velocity signal f of the objective lens 110 and the optical head 121 and outputting a signal g when the amount of displacement of the objective lens 110 from the neutral position exceeds a predetermined value.

The relative velocity signal f and the head move detection signal e are input to the AT servo circuit 61 as in the embodiment of FIG. 25, and the head move requiring pulse d and the AT abnormality signal H are output to the system controller 119 by the circuit shown in FIG. 23.

The signal g is input to the system controller 119, and only when the signal g is input to the system controller 119, the system controller 119 outputs a driving pulse in accordance with the head move requiring pulse d and drives the head feed motor 122. That is, the optical head 121 is moved only when the objective lens 110 is at a position spaced apart from the neutral position by a predetermined distance or greater.

With such a construction, even if the AT abnormality detection sensitivity is reduced during the movement of the head, the objective lens 110 is returned to the neutral position at a great acceleration, because the objective lens 110 is at a position spaced apart from the neutral position when AT abnormality occurs, and thus proper AT abnormality detection can be accomplished.

The present invention permits various applications besides the above-described embodiments. The present invention is also applicable to an apparatus using a disc-like or tape-like medium instead of the above-described optical card. Also, when the medium is of the transmission type, the light transmitted through such a medium may be received by a photodetector to thereby detect a tracking error signal.

The present invention covers all such applications without departing from the scope thereof as defined in the appended claims.

What is claimed is:

1. An apparatus for applying a light beam to an optical recording medium having tracks provided thereon and for effecting at least one of recording and reproduction of information, said apparatus comprising:
   a light source for emitting the light beam;
   an optical system for directing the light beam emitted from said light source to the medium;
   means for receiving the light flux reflected by or transmitted through the medium to detect a tracking error signal indicative of the deviation between the applied position of the light beam on the medium and a track;
   tracking servo means for moving at least a portion of said optical system on the basis of the tracking error signal to correct the applied position of the light beam so that the light beam follows the track; and
   means for detecting abnormality of tracking servo from the velocity of the moved portion of said optical system when operating said tracking servo means.

2. An apparatus according to claim 1, wherein said abnormality detecting means outputs a detection signal when the velocity of the moved portion of said optical system exceeds a predetermined value.

3. An apparatus according to claim 2, wherein said abnormality detecting means comprises a displacement detector for detecting the displacement of the moved portion of said optical system, a velocity detecting circuit for detecting the velocity of the moved portion from the output of said displacement detector, and a comparator for comparing the output of said velocity detecting circuit with a predetermined level.

4. An apparatus according to claim 1, wherein said abnormality detecting means comprises a displacement detector for detecting the displacement of the moved portion of said optical system, a high-pass filter for extracting frequency components of a predetermined frequency or greater from the output, of said displacement detector, and comparing means for outputting a detection signal when the output of said high-pass filter deviates from a predetermined range.

5. An apparatus according to claim 4, wherein said comparing means comprises two comparators for comparing the output of said high-pass filter with an upper limit value and a lower limit value, respectively, and an OR circuit for outputting the logic sum signal of said comparators.

6. An apparatus according to claim 1, wherein said abnormality detecting means comprises a displacement detector for detecting the displacement of the moved portion of said optical system, a differentiating circuit for differentiating the output of said displacement detector, and comparing means for outputting a detection signal when the output of said differentiating circuit deviates from a predetermined range.

7. An apparatus according to claim 6, wherein said comparing means comprises two comparators for comparing the output of said differentiating circuit with an upper limit value and a lower limit value, respectively, and an OR circuit for outputting the logic sum signal of said comparators.

8. An apparatus according to claim 1, further comprising level detecting means for detecting that the level of said tracking error signal deviates from a predetermined range, and means for determining that abnormality has occurred to tracking servo only when the level deviates from the predetermined range and said abnormality detecting means detects abnormality.

9. An apparatus according to claim 8, wherein said level detecting means comprises two comparators for comparing the output of said tracking error signal, detecting means with an upper limit value and a lower limit value, respectively, and an OR circuit for outputting the logic sum signal of said comparators.

10. An information recording apparatus comprising:
means for applying a light beam to an optical recording medium having tracks provided thereon and for effecting recording of information;
means for receiving the light flux reflected by or transmitted through the medium and for detecting a tracking error signal indicative of the deviation between the applied position of the light beam and a track;
tracking servo means for correcting the applied position of the light beam on the basis of the tracking error signal so that the light beam follows the track;
abnormality detecting means for detecting abnormality of tracking servo on the basis of the quantity of light received by said tracking error signal detecting means when operating said tracking servo means and for outputting an abnormality detection signal; and
a controller for receiving the abnormality detection signal output by said abnormality detecting means and for stopping recording based on the detected abnormality.

11. An information recording apparatus according to claim 10, wherein said tracking error signal detecting means comprises a photoelectric conversion element having divided light-receiving positions, and a subtractor for differentiating signals output from said light-receiving portions.

12. An information recording apparatus according to claim 11, wherein said abnormality detecting means comprises an adder for adding together signals output from the divided light-receiving portions of said photoelectric conversion element, and a comparator for comparing the output of said adder with a predetermined level.

13. An information recording and reproducing apparatus comprising:
means for applying a light beam to an optical recording medium having tracks provided thereon and for effecting recording and reproduction of information;
means for receiving light flux reflected by or transmitted through the medium and for detecting a tracking error signal indicative of the deviation between the applied position of the light beam and a track;
tracking servo means for correcting the applied position of the light beam on the basis of the tracking error signal;
means for detecting abnormality of the tracking servo; and
sensitivity changing means for setting the detection sensitivity of said abnormality detecting means higher during recording of information than during reproduction of information.

14. An information recording and reproducing apparatus according to claim 13, wherein said abnormality detecting means outputs an abnormality detection signal when the quantity of light received by the tracking error signal detecting means exceeds a reference value.

15. An information recording and reproducing apparatus according to claim 14, wherein said sensitivity changing means varies the reference value between values during recording and during reproduction.

16. An information recording and reproducing apparatus according to claim 13, wherein said tracking error signal detecting means comprises a photoelectric conversion element having divided light-receiving portions, and a subtractor for differentiating signals output from said light-receiving portions.

17. An information recording and reproducing apparatus according to claim 16, wherein said abnormality detecting means comprises an adder for adding together the signals output from the divided light-receiving portions of said photoelectric conversion element, and a level variable comparator for comparing the output of said adder with a reference level.

18. An information recording and reproducing apparatus according to claim 17, wherein said sensitivity changing means varies the reference level of said level variable comparator.

19. An information recording and reproducing apparatus according to claim 13, wherein said recording and reproducing means effects verification after recording, and said sensitivity changing means sets the detection sensitivity of said abnormality detecting means higher during verification than during recording.

20. An information recording and reproducing apparatus according to claim 19, wherein said recording and reproducing means comprises a light source for emitting a light beam, and an optical system for directing the light beam emitted from said light source to the medium, and said tracking servo means moves at least a portion of said optical system on the basis of the tracking error signal.

21. An information recording and reproducing apparatus according to claim 20, wherein said abnormality detecting means comprises first detecting means for outputting a detection signal when the quantity of light received by said tracking error signal detecting means exceeds a reference value, and second detecting means for outputting a detection signal when the velocity of the moved portion of said optical system exceeds a reference value, and said sensitivity changing means comprises switching means for outputting only the detection signal of said first detecting means as an abnormality detection signal during verification and for outputting a logic product signal of the outputs of said first and second detecting means as an abnormality detection signal during recording and during reproduction.

22. An information recording and reproducing apparatus according to claim 21, wherein said sensitivity changing means varies the reference value of said second detecting means between values during recording and during reproduction.

23. An information recording and reproducing apparatus according to claim 19, wherein said abnormality detecting means produces a detection signal when the velocity of the moved portion of said optical system exceeds a reference value, and said sensitivity changing means outputs only the detection signal as an abnormality detection signal only during recording and during verification.

24. An information recording and reproducing apparatus according to claim 23, wherein said sensitivity changing means varies the reference value between values during recording and during verification.

25. An apparatus for applying a light beam to an optical recording medium having tracks provided thereon and for effecting at least one of recording and reproduction of information, said apparatus comprising:
- an optical head comprising a light source for emitting the light beam, and an optical system for directing the light beam emitted from said light source to the medium;
- means for moving said optical head in a direction across the tracks;
- means for receiving the light flux reflected by or transmitted through the medium and for detecting a tracking error signal indicative of the deviation between the applied position of the light beam and a track;
- tracking servo means for moving at least a portion of said optical system on the basis of the tracking error signal and for correcting the applied position of the light beam;
- means for detecting abnormality of the tracking servo; and
- sensitivity changing means for setting the sensitivity of said abnormality detecting means lower during movement of said optical head than during non-movement of said optical head.

26. An apparatus according to claim 25, wherein said abnormality detecting means outputs an abnormality detection signal when the quantity of light received by said tracking error signal detecting means exceeds a reference value.

27. An apparatus according to claim 26, wherein said sensitivity changing means varies the reference value of said abnormality detecting means on the basis of a head driving signal input to said optical head moving means.

28. An apparatus according to claim 25, wherein said abnormality detecting means outputs a detection signal when the velocity of the moved portion of said optical system exceeds a reference value.

29. An apparatus according to claim 28, wherein said sensitivity changing means comprises a head movement detector for detecting whether said optical head is being moved, and a level setter for varying the reference value of said abnormality detecting means in conformity with the output of said head movement detector.

* * * * *

UNITED STATES PATENT AND TRADEMARK OFFICE
CERTIFICATE OF CORRECTION

PATENT NO. : 4,982,393
DATED : January 1, 1991
INVENTOR(S) : Machiko Matsushita, et al.

It is certified that error appears in the above-identified patent and that said Letters Patent is hereby corrected as shown below:

On the Title Page:

IN THE REFERENCES CITED

U.S. PATENT DOCUMENTS

"4,554,465 11/1985 Maeda et al..." should read --4,554,652 11/1985 Maeda et al...--.

IN THE DRAWINGS

FIGURE 11

"Abnomality" should read --Abnormality--.

FIGURE 27

"Requring" should read --Requiring--.

UNITED STATES PATENT AND TRADEMARK OFFICE
CERTIFICATE OF CORRECTION

PATENT NO. : 4,982,393
DATED : January 1, 1991
INVENTOR(S) : Machiko Matsushita, et al.

It is certified that error appears in the above-identified patent and that said Letters Patent is hereby corrected as shown below:

COLUMN 1

Line 17, "medium" should read --media--; and
    Line 21, "mediums" should read --media--.

COLUMN 2

Line 7, "reciprocally," should read --reciprocally--.

COLUMN 3

Figure 1:
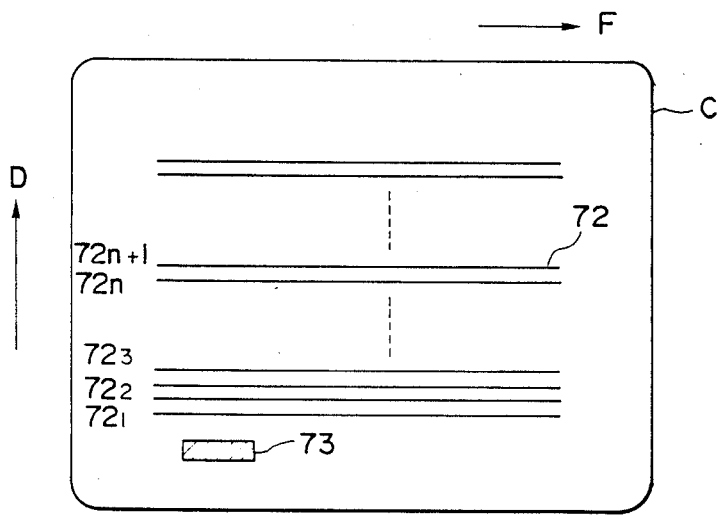
FIGS. 1 and 2 are a schematic plan view and a fragmentary enlarged view, respectively, of an optical card.
Figure 2:
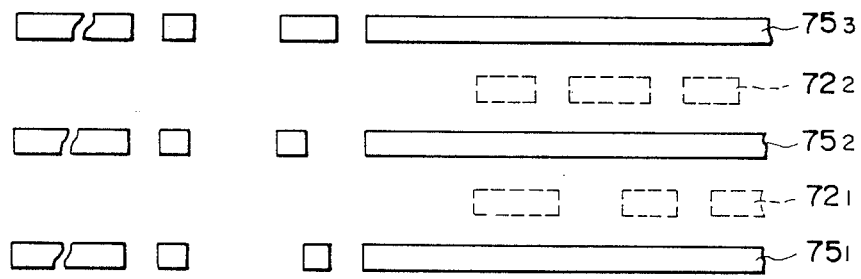

Line 29, "shown," should read --shown--; and
    Line 53, "Fig. 1." should read --Fig. 11.--.

COLUMN 7

Line 58, "duction, thereby," should read --duction. Thereby,--; and
    Line 60, "reproduction" should read --reproduction,--.

UNITED STATES PATENT AND TRADEMARK OFFICE
CERTIFICATE OF CORRECTION

PATENT NO. : 4,982,393                    Page 3 of 3

DATED : January 1, 1991

INVENTOR(S) : Machiko Matsushita, et al.

It is certified that error appears in the above-identified patent and that said Letters Patent is hereby corrected as shown below:

COLUMN 10

Line 2, "ma" should read --may--.

COLUMN 12

Line 63, "double-head" should read --double-headed--.

COLUMN 15

Line 14, "output," should read --output--; and
    Line 48, "signal," should read --signal--.

Signed and Sealed this

Tenth Day of November, 1992

*Attest:*

DOUGLAS B. COMER

*Attesting Officer*          *Acting Commissioner of Patents and Trademarks*